US012482004B2

(12) United States Patent
Hazra et al.

(10) Patent No.: US 12,482,004 B2
(45) Date of Patent: Nov. 25, 2025

(54) CARBON FOOTPRINT ESTIMATION USING FOUNDATION MODEL

(71) Applicant: International Business Machines Corporation, Armonk, NY (US)

(72) Inventors: Jagabondhu Hazra, Bangalore (IN); Manikandan Padmanaban, Chennai (IN); Ayush Jain, Lucknow (IN); Ranjini Bangalore Guruprasad, Bangalore (IN); Shantanu R. Godbole, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 18/473,435

(22) Filed: Sep. 25, 2023

(65) Prior Publication Data
US 2025/0104093 A1 Mar. 27, 2025

(51) Int. Cl.
*G06Q 30/018* (2023.01)

(52) U.S. Cl.
CPC ................... *G06Q 30/018* (2013.01)

(58) Field of Classification Search
None
See application file for complete search history.

(56) References Cited

U.S. PATENT DOCUMENTS

| 10,902,484 B1 | 1/2021 | Pepere et al. |
| 2011/0178938 A1 | 7/2011 | Reich-Weiser et al. |
| 2016/0055596 A1 | 2/2016 | Dilip et al. |
| 2022/0207552 A1 | 6/2022 | Normand et al. |
| 2022/0222437 A1* | 7/2022 | Lauber ............... G10L 15/26 |
| 2023/0162203 A1* | 5/2023 | Umay ................. G06Q 50/40 705/317 |

(Continued)

OTHER PUBLICATIONS

Anonymous, "Method of Identifying Environmental Footprint Impact fromUnstructured Text" Apr. 27, 2021, An IP.com Prior Art Database Technical Disclosure, IP.com No. IPCOM000265591D.

(Continued)

*Primary Examiner* — George Chen
(74) *Attorney, Agent, or Firm* — CANTOR COLBURN LLP; Kelsey M. Skodje

(57) ABSTRACT

A Scope 3 emission system includes a controller with a microprocessor and a memory. The memory stores executable instructions that when executed by the microprocessor cause the microprocessor to perform a computer-executable method. The method comprises generating embeddings based on enterprise financial transaction data, enterprise metadata, and crowd source data, and generating sector wise carbon-aware spatio-temporal weights indicative of an estimated level of Scope 3 emissions produced by a corresponding commodity sector. The method further includes generating a carbon-aware natural language processing (NLP) foundation model (FM) based on the embeddings and the sector wise carbon-aware spatio-temporal weights. User-generated data indicating at least one target commodity sector and spend data associated with the target commodity sector is input into the NLP FM, and the NLP FM outputs an estimation of the Scope 3 emissions based on the least one target commodity sector and the spend data.

20 Claims, 5 Drawing Sheets

(56) References Cited

U.S. PATENT DOCUMENTS

2023/0186161 A1* 6/2023 Arthur .................... G06F 40/58
　　　　　　　　　　　　　　　　　　　　　　704/2

OTHER PUBLICATIONS

Balaji et al., "CaML: Carbon Footprinting of Household Products with Zero-Shot Semantic Text Similarity." Proceedings of the ACM Web Conference 2023. pp. 4004-4014.

Huang et al., "Categorization of scope 3 emissions for streamlined enterprise carbon footprinting." Environ. Sci. Technol, 43, 22, (2009): 8509-8515.

Microsoft Learn, "Scope 3 emissions," https://learn.microsoft.com/en-us/industry/sustainability/calculate-scope3 (retrieved Aug. 3, 2023), 12 pages.

Sandwidi et al., "Transformers-Based Approach for a Sustainability Term-Based Sentiment Analysis (STBSA)." Proceedings of the Second Workshop on NLP for Positive Impact (NLP4PI). 2022, pp. 157-170.

Balaji Bharathan, "amazon-science/carbon-assessment-with-ml", retrieved from link https://github.com/amazon-science/carbon-assessment-with-ml, Jun. 27, 2023, 4 pages.

* cited by examiner

US 12,482,004 B2

CARBON FOOTPRINT ESTIMATION USING FOUNDATION MODEL

BACKGROUND

The present disclosure generally relates to climate-related technologies, and more specifically, to methods and systems for estimating carbon footprints using a foundation model.

Company or organizational activities such as an organization's product supply chains, for example, are responsible for non-trivial amounts of greenhouse gas (GHG) emissions. GHG emissions are categorized into three different scopes, often referred to as "Scope 1," "Scope 2," and "Scope 3" emissions. These scopes are used to classify and account for different sources of emissions associated with an organization's activities.

Scope 1 emissions (also referred to as S1 emissions) are the direct GHG emissions that result from sources that are owned or controlled by the organization (e.g., onsite energy consumption, company-owned vehicles, etc.). These emissions are typically associated with the organization's core operations and activities. Scope 2 emissions (also referred to as S2 emissions) are indirect emissions that result from the generation of electricity, heat, or steam purchased or consumed by the organization. These emissions are associated with the production of the energy used by the organization but occur at a separate facility, such as a power plant or a remote heating plant. Scope 3 emissions (also referred to as S3 emissions) are all other indirect emissions that occur as a result of the organization's activities but are not classified as Scope 1 or Scope 2. These emissions typically encompass a broader range of sources and are often more challenging to quantify and manage.

SUMMARY

According to a non-limiting embodiment, a Scope 3 emission system includes a controller with a microprocessor and a memory. The memory stores executable instructions that when executed by the microprocessor cause the microprocessor to perform a computer-implemented method. The method comprises generating embeddings based on enterprise financial transaction data, enterprise metadata, and crowd source data, and generating sector wise carbon-aware spatio-temporal weights indicative of an estimated level of Scope 3 emissions produced by a corresponding commodity sector. The method further includes generating a carbon-aware natural language processing (NLP) foundation model (FM) based on the embeddings and the sector wise carbon-aware spatio-temporal weights. User-generated data indicating at least one target commodity sector and spend data associated with the target commodity sector is input into the NLP FM, and the NLP FM outputs an estimation of the Scope 3 emissions based on the least one target commodity sector and the spend data.

According to another non-limiting embodiment, a method of estimating Scope 3 emissions is provided. The method comprises generating embeddings based on enterprise financial transaction data, enterprise metadata, and crowd source data, generating sector wise carbon-aware spatio-temporal weights indicative of an estimated level of Scope 3 emissions produced by a corresponding commodity sector, and generating a carbon-aware natural language processing (NLP) foundation model (FM) based on the embeddings and the sector wise carbon-aware spatio-temporal weights. The method further comprises inputting into the NLP FM user-generated data indicating at least one target commodity sector and spend data associated with the target commodity sector, and outputting from the NLP FM an estimation of the Scope 3 emissions based on the least one target commodity sector and the spend data.

According to yet another non-limiting embodiment, a computer program product comprising a computer readable storage medium having program instructions embodied therewith to estimate Scope 3 emissions, the program instructions executable by a processor to cause the processor to perform operations comprising generating embeddings based on enterprise financial transaction data, enterprise metadata, and crowd source data, generating sector wise carbon-aware spatio-temporal weights indicative of an estimated level of Scope 3 emissions produced by a corresponding commodity sector, and generating a carbon-aware natural language processing (NLP) foundation model (FM) based on the embeddings and the sector wise carbon-aware spatio-temporal weights. The operations further comprise inputting into the NLP FM user-generated data indicating at least one target commodity sector and spend data associated with the target commodity sector, and outputting from the NLP FM an estimation of the Scope 3 emissions based on the least one target commodity sector and the spend data.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
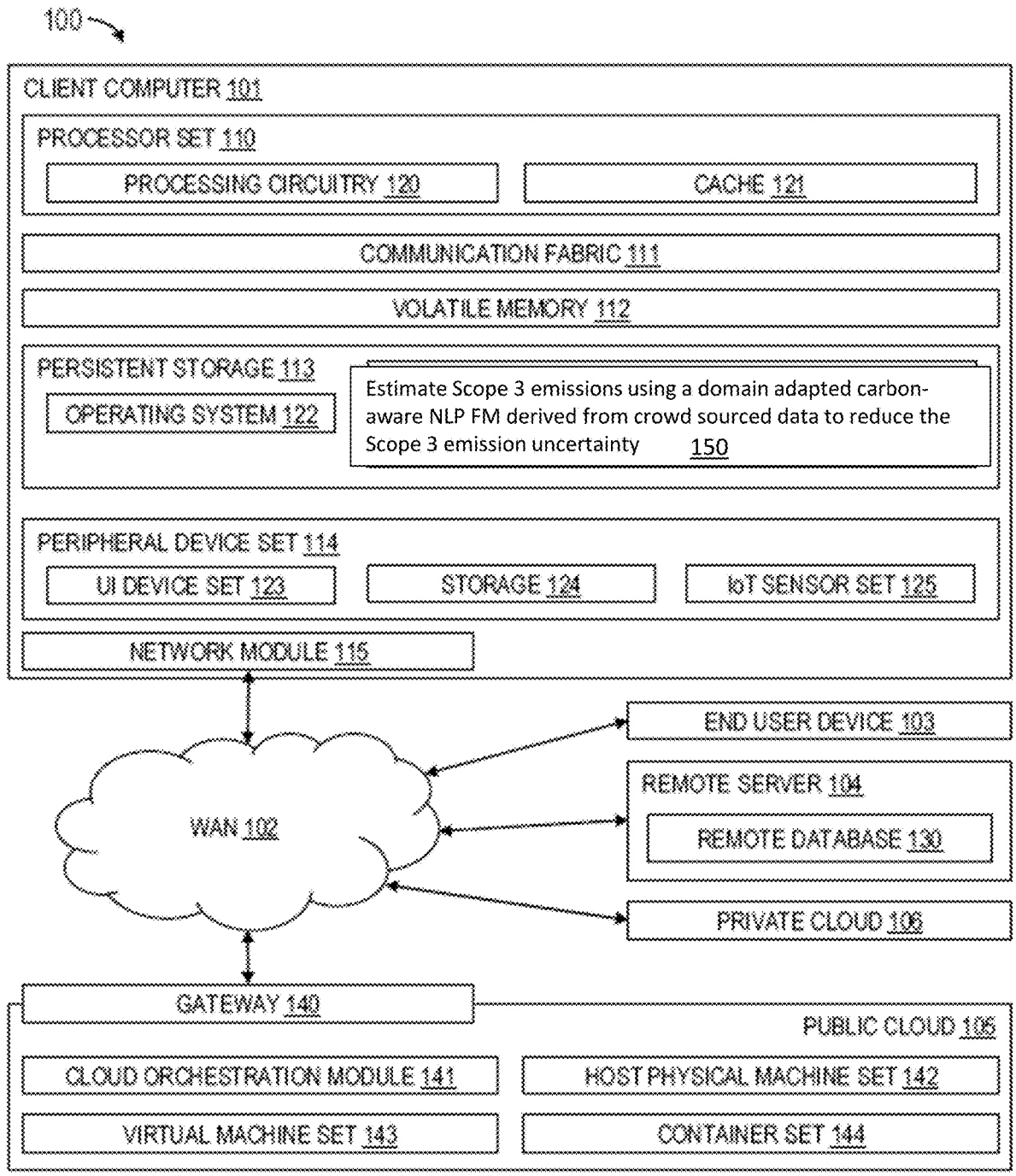
FIG. 1 depicts a block diagram of a computing system implementing a Scope 3 emission system configured to estimate the Scope 3 emissions using a domain adapted carbon-aware NLP FM derived from crowd sourced data with reduced Scope 3 emission uncertainty according to a non-limiting embodiment of the present disclosure.

The three scopes of greenhouse gas emissions (i.e., Scope 1, Scope 2, and Scope 3) provide a comprehensive framework for organizations to assess and manage their emissions, ranging from direct, controllable sources to indirect sources associated with their supply chain and broader activities. This framework is commonly used in corporate sustainability reporting that are made available to the public and carbon management efforts.

Scope 3 emissions account for a significant portion of an organization's total carbon footprint and are important for understanding the full environmental impact of the organization's operations. Managing and reducing Scope 3 emissions often involve collaboration with suppliers and customers. For large businesses, however, upstream supply-chain partners that contribute to Scope 3 emissions can span the globe and number in the thousands or tens of thousands. Thus, reporting Scope 3 emissions is extremely difficult due to the sheer number of partners in the value chain. Moreover, commodity recognition from purchase orders is difficult and mapping of the commodity/service to product/industry category is not scalable using either using manual mapping or natural language processing (NLP) foundation model (FM) without obtaining a substantial about amount of domain embeddings.

At least one non-limiting embodiment of the present disclosure provides a Scope 3 emission system, which uses enterprise financial transaction data, enterprise metadata and crowd source data to derive embeddings. The crowd source data includes enterprise revenue data, enterprise employee data, enterprise electricity consumption data, and enterprise renewable fraction data, which can be obtained from publicly available enterprise financial reports and sustainability reports. The embeddings include enterprise embeddings, cost embeddings, geography embeddings, sector embeddings and spatio-temporal embeddings, which are derived from the enterprise financial transaction data, enterprise metadata and crowd source data. The Scope 3 emission system uses the embeddings along with estimated sector wise carbon-aware spatio-temporal weights to build a domain-adapted carbon-aware NLP foundation model (FM). The novel domain-adapted carbon-aware NLP FM can then be used by the Scope 3 emission system to estimate Scope 3 emissions with reduced Scope 3 uncertainty and estimation error.

One or more non-limiting embodiments of the present disclosure provides a method, which derives embeddings (enterprise, cost, geography, sector & spatio-temporal) to reduce the classification ambiguity of financial transaction data by leveraging derived spatio-temporal weights for domain adaptation of a NLP FM loss function based on derived carbon intensity of the industries/sectors to reduce the overall uncertainty of Scope 3 emission estimations.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 according to a non-limiting embodiment of the present disclosure contains an example of an environment for the execution of at least some of the computer code involved in performing the inventive methods, such as to estimate the Scope 3 emissions using a domain adapted carbon-aware NLP FM derived from crowd sourced data to reduce the Scope 3 emission uncertainty 150 (also referred to herein as a Scope 3 emission system 150). In addition to the Scope 3 emission system 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Scope 3 emission system 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Scope 3 emission system 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code utilized by the Scope 3 emission system 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 can include internal storage, external storage, such as an external hard drive, and/or insertable storage, such as an SD card. The Storage 124 can also be implemented as persistent and/or volatile storage. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

One or more embodiments described herein can utilize machine learning techniques to perform tasks, such as estimating the Scope 3 emissions using a domain adapted carbon-aware NLP FM derived from crowd sourced data to improve the Scope 3 emission estimation. More specifically, one or more embodiments described herein can incorporate and utilize rule-based decision making and artificial intelligence (AI) reasoning to accomplish the various operations described herein, which include using enterprise financial transaction data, enterprise metadata and crowd source data (enterprise financial and public environmental sustainability reports) to derive a set of enterprise embeddings, cost embeddings, geography embeddings, sector embeddings and spatio-temporal embeddings, and to estimate the sector wise carbon-aware spatio-temporal weights to build a domain adapted carbon-aware NLP Foundation model (FM) capable of estimating Scope 3 emissions having reduced Scope 3 uncertainty. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for estimating the Scope 3 emissions using a domain adapted carbon-aware NLP FM derived from crowd sourced data to reduce the Scope 3 emission uncertainty and estimation error, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of learning how to use enterprise financial transaction data, enterprise metadata and crowd source data (enterprise financial and sustainability reports) to derive a set of embeddings (e.g., enterprise embeddings, cost embeddings, geography embeddings, sector embeddings and spatio-temporal embeddings), and to estimate the sector wise carbon-aware spatio-temporal weights to build a domain adapted carbon-aware NLP Foundation model (FM) derived from crowd sourced data to estimate the Scope 3 emission and reduce the Scope 3 uncertainty and estimation error, as described herein.

Figure 2:
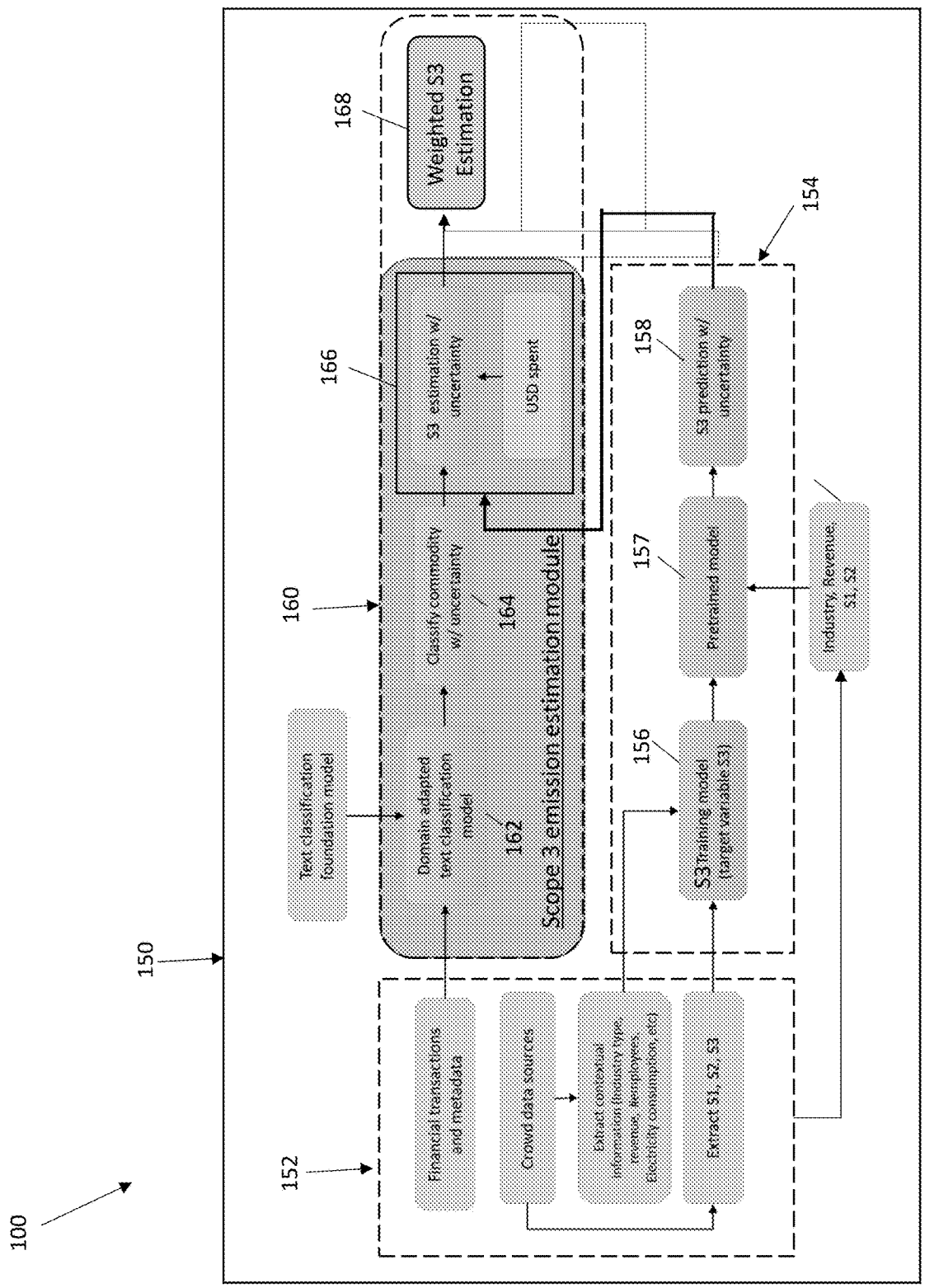
FIG. 2 is a block diagram of a Scope 3 emission system according to a non-limiting embodiment of the present disclosure.

Turning now to FIG. 2, a Scope 3 emission system 150 configured to estimate scope 3 emissions is illustrated according to a non-limiting embodiment. As described herein, the Scope 3 emission system 150 employs a domain adapted carbon-aware NLP FM derived from crowd sourced data. In this manner, the Scope 3 emission uncertainty (e.g., error between the level of Scope 3 emissions estimated and the level of Scope 3 emissions actually produced) can be reduced when estimating the Scope 3 emissions.

In one or more non-limiting embodiments, the Scope 3 emission system 150 utilizes enterprise financial transaction data, enterprise metadata and crowd source data (e.g., enterprise financial and sustainability reports) to derive a set of enterprise embeddings, cost embeddings, geography embeddings, sector embeddings and spatio-temporal embeddings. The system also generates sector-wise carbon-aware spatio-temporal weights, which are applied to various commodity sectors (e.g. agriculture, fishing, mining, textiles, motor vehicles, electricity usage, gas/fuel consumption, air transport, etc.) to reduce the error in sector-based carbon effect and increase sector/commodity categorization identification sensitivity. Accordingly, the Scope 3 emission system 150 utilizes the embeddings and the sector-wise carbon-aware spatio-temporal weights to build a domain adapted carbon-aware NLP foundation model (FM) to estimate the Scope 3 emissions with improved Scope 3 uncertainty.

With continued reference to FIG. 2, the Scope 3 emission system 150 includes a data extraction module 152, a regressor model training module 154, and a Scope 3 emission estimation module 160. Any one of the data extraction module 152, the regressor model training module 154, and the Scope 3 emission estimation module 160 can be constructed as an electronic hardware controller that includes memory and a processor configured to execute algorithms and computer-readable program instructions stored in the memory. In another non-limiting embodiment, the regressor model training module 154, and the Scope 3 emission estimation module 160 can all be embedded or integrated to establish the Scope 3 emission system 150 as a single controller.

The data extraction module 152 performs data extraction on financial transaction data and crowd source data to obtain model parameters and training data used for generating the domain adapted carbon-aware NLP FM used to estimate Scope 3 emissions. For example, the data extraction module 152 can access a database storing purchase orders, invoices, receipts and expense reports, and extract financial information such as costs spent on commodities or products purchased and sold, number of units purchased and sold, costs spent on supply chains used to handle purchased and sold commodities. The data extraction module 152 can also access a database storing crowd source data to extract contextual information and records associated with emissions scope. The contextual information includes, but is not limited to, industry/sector types, enterprise revenues, number of employees, energy consumption, renewable fraction, and travel records. The emission records can provide data such as, for example, emission sources owned or controlled directly by an enterprise (i.e., S1 emission data) and emissions bought or purchased by the enterprise (i.e., S2 emission data), and historical estimations of Scope 3 emissions contributed by the enterprise (i.e., S3 emission data).

The regressor model training module 154 includes an S3 training module 156, a pretrained model 157, and an S3 predictor 158. The S3 training module 156 receives the extracted emissions records (e.g., the S1, S2 and S3 emissions data) and performs several training iterations to generate a regressor pretrained model 157. Once training is completed, the regressor pretrained model 157 can input contextual information (industry type, revenue, number employees, etc.) and Scope 1 data Scope 2 data and predicts the Scope 3 emissions. Accordingly, targeted contextual data (e.g., industry and enterprise revenue) and targeted S1 and S2 emissions data for a given sector or enterprise can be input to the pretrained model 157. The output of the pretrained model 157 is used by the S3 predictor 158 to output predicted Scope 3 emissions estimation. At this stage, the estimation of Scope 3 emissions suffers from uncertainty caused by the absence of data identifying the commodity class associated with the input emissions data and its contribution to the overall Scope 3 emissions estimation.

The Scope 3 emission estimation module 160 includes a text classification model 162, a commodity classifier 164, and an S3 estimator 166. The text classification model 162 receives a text classification foundation model (FM) 161, along with financial transaction data and metadata to generate targeted text and words that may be associated with various types of commodities. The commodity classifier 164 receives the targeted text and words and determines a commodity sector associated with the financial transaction data and metadata input to the Scope 3 emission estimation module 160. The S3 estimator 166 receives the determined commodity along with spend data (USD spent) associated with the commodity sector to generate an estimation of Scope 3 emissions 167, which takes into account the commodity class associated with the input emissions data and its contribution to the overall Scope 3 emissions estimation.

The estimation of Scope 3 emissions 167, however, have uncertainty at this stage because it does not take into account the context of the financial transaction (e.g., revenue data and the enterprise/industry) or the contributions S1 and S2 emissions data has on the overall Scope 3 emissions estimation. Therefore, the Scope 3 emission estimation module 160 inputs the predicted Scope 3 emissions estimation 158 output from the pretrained model 157 to the S3 estimator 166, which combines it with the estimation of Scope 3 emissions 167 to generate a weighted estimation of S3 emissions 168. Accordingly, the weighted S3 emissions 168 includes sector-wise carbon-aware spatio-temporal weights, which are applied to various commodity sectors (e.g. agriculture, fishing, mining, textiles, motor vehicles, electricity usage, gas/fuel consumption, air transport, etc.) to reduce the error in sector-based carbon effect and increase sector/commodity categorization identification sensitivity.

Figure 3:
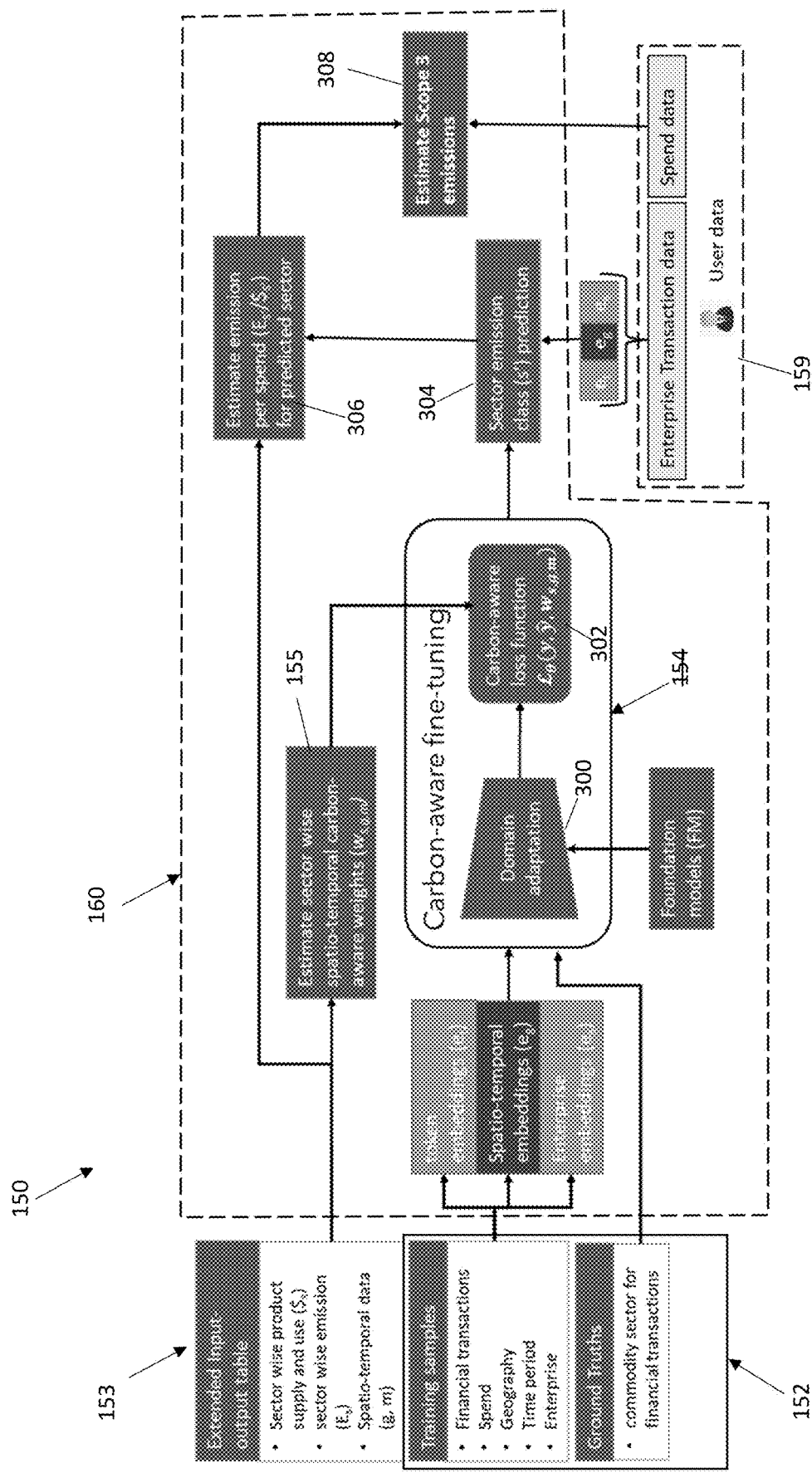
FIG. 3 is a block diagram of a Scope 3 emission system implementing a carbon-aware FM which utilizes sector wise spatio-temporal carbon-aware weights according to a non-limiting embodiment of the present disclosure.

Referring now to FIG. 3, a non-limiting embodiment of the Scope 3 emission system 150 can include a Scope 3 emission estimation module 160 that determines emission intensities for respective commodity sectors to further reduce Scope 3 emission uncertainty and estimation errors. The Scope 3 emission estimation module 160 includes a carbon-aware NLP FM module 163 configured to perform fine-tuning and inferencing of a FM model for Scope 3 estimation with reduced uncertainty.

The carbon-aware NLP FM module 163 employs a domain adaption module 300 and a carbon-aware loss function 302. The domain adaptation module 300 receives embeddings (e.g., financial transaction embeddings, spatio-temporal embeddings, and enterprise embeddings) generated from training data, along with ground truth data (commodity sector identification mapped to known financial transactions). The embeddings, ground truth data and one or more foundation models (FMs) 301 are input to a domain adaption module 300 (e.g., an machine learning auto-encoder), which adapts the embeddings and ground truths into a targeted domain, e.g., GHG and carbon emissions.

The carbon-aware loss function 302 receives the output data generated by the domain adaption module 300 along with estimated sector-wise spatio-temporal weights ($w_{s,g,m}$) 155. The known commodity sector data includes known sector-wise product and user data, e.g., user-generated sector spend data ($\$_s$), known sector-wise emission data ($E_s$), and known spatial-temporal data (g, m), all which can be provided by enterprises, listed in published historical company records, and/or described in publicly available corporate sustainability reports or global emissions reporting initiatives. Accordingly, the carbon-aware loss function 302 can utilize the estimated sector-wise spatio-temporal weights ($w_{s,g,m}$) 155 to fine-tune the FMs 301 with higher penalization on misclassification of sectors with higher carbon footprint. In this manner, the accuracy categorizing commodity sectors and their contributions on overall S3 emissions is increased.

The Scope 3 emission estimation module 160 receives the output from the carbon-aware loss function 302, along with user-generated data 159 such as, for example, user-generated enterprise transaction data and user-generated spend data. In a non-limiting embodiment, the user-generated enterprise transaction data and the spend data can be input by a user via the computer system 100. Using the output from the carbon-aware loss function 302 and the known commodity sector data, the Scope 3 emission estimation module 160 predicts the commodity sector emission class (s') 304 (e.g. agriculture, fishing, mining, textiles, motor vehicles, electricity usage, gas/fuel consumption, air transport, etc.) that is responsible for contributing to the overall Scope 3 emissions.

The Scope 3 emission estimation module 160 also receives the known commodity sector data (e.g., known sector-wise product and use data ($\$s$), known sector-wise emission data (Es), and known spatial-temporal data (g, m)). Using the known commodity sector data and the predicted sector emission class (s'), the Scope 3 emission estimation module 160 calculates an estimated emission per spend (Es'/$\$s'$) 306 for the predicted commodity sector class (s'). and then at operation 308 uses the FMs 301 that are fine-tuned by the loss-function at 302.

As described herein, the Scope 3 emission system 150 utilizes the commodity sector data (e.g., known sector-wise product and use data ($\$s$), known sector-wise emission data (Es), and known spatial-temporal data (g, m)) to estimate both the emission per spend (Es'/$\$s'$) of a predicted sector emission class (s') and the sector-wise spatio-temporal weights ($w_{s,g,m}$). The ratio of commodity sector emission per commodity sector spend (Es'/$\$s'$) is indicative of an estimated emission intensity ($EI_{s,g,m}$) of a given commodity sector and can be expressed as follows:

$$EI_{s,g,m} = E_{s,g,m}/\$_{s,g,m} \qquad \text{eq. 2}$$

Accordingly, the emission intensity for a given commodity sector ($EI_{s,g,m}$) at a given geographic location (g) and over a given time duration (d) can be determined as a ratio of estimated emissions produced by the given commodity sector at the geographic location and for the duration ($E_{s,g,m}$) with respect to a monetary amount spent by the given commodity sector at the geographic location and for the duration ($\$_{s,g,m}$).

In one or more non-limiting embodiments, the Scope 3 emission system 150 can utilize the estimated emission intensity ($EI_{s,g,m}$) to estimate the sector-wise spatio-temporal weights ($w_{s,g,m}$) for a given sector(s), geography (g) and duration (m) based on the following equation:

$$w_{s,g,m} = \frac{EI_{s,g,m}}{\Sigma_s EI_{s,g,m}} \qquad \text{eq. 3}$$

As described above, the sector-wise spatio-temporal weight for a given commodity sector expressed as a ratio of the emission intensity for a given commodity sector ($EI_{s,g,m}$) with respect a sum of the emission intensities for the plurality of different commodity sectors ($\Sigma_s EI_{s,g,m}$).

In one or more non-limiting embodiments, the estimated emission intensities ($EI_{s,g,m}$) and corresponding carbon-aware weights ($w_{s,g,m}$) of a variety of different commodity sectors can be calculated and stored in an extended IO table or look-up table (LUT). In this manner, a predicted commodity class (s') can be mapped to its corresponding stored commodity sector listed in the table to obtain its emission intensity ($EI_{s,g,m}$) and sector-wise spatio-temporal weight ($w_{s,g,m}$).

Figure 4:
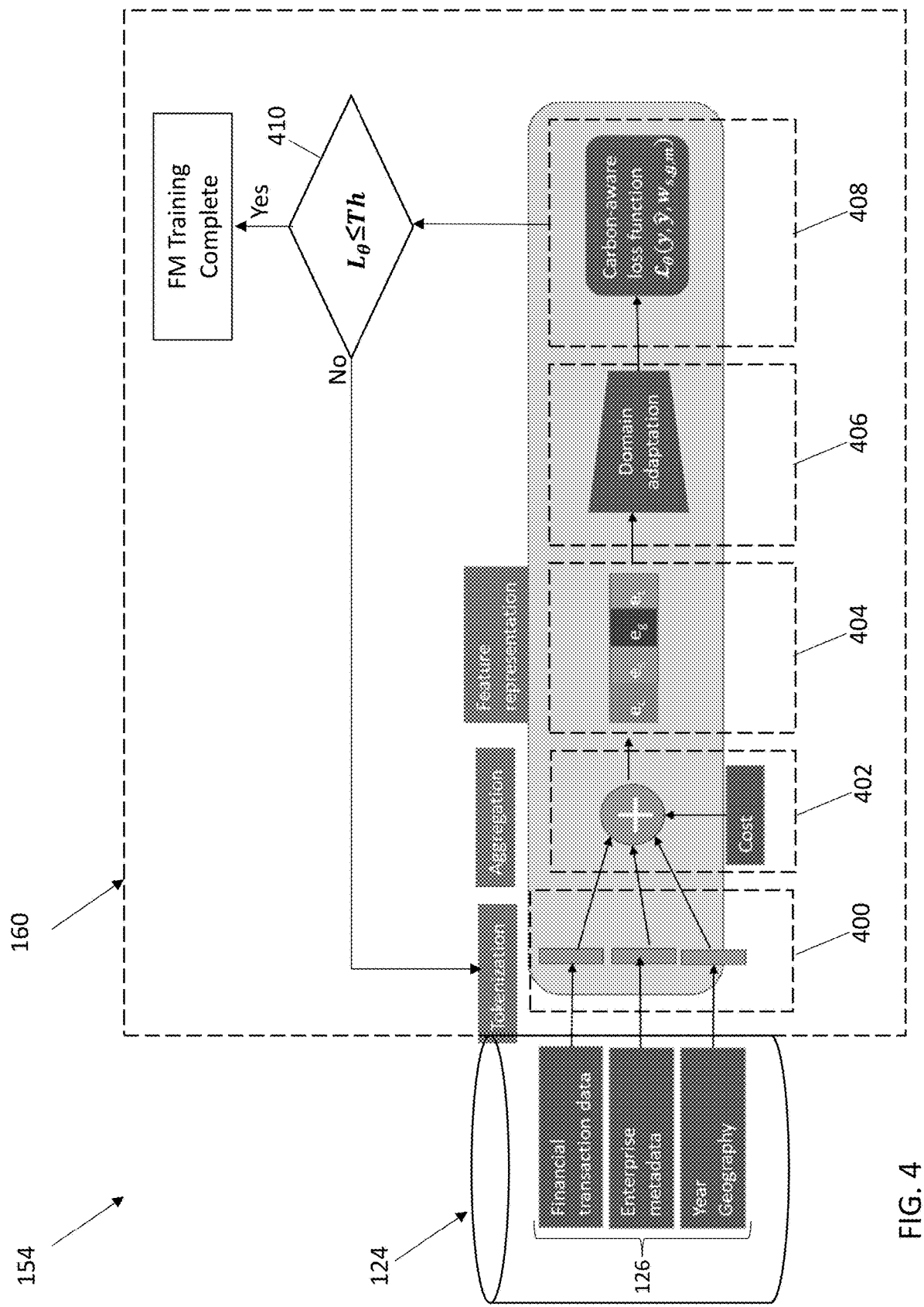
FIG. 4 depicts a method of fine-tuning a carbon-aware FM using a carbon-aware loss function according to a non-limiting embodiment of the present disclosure.

Turning now to FIG. 4, operations performed by the Scope 3 emission estimation module 160 for training the overall Scope 3 emission system 150 is illustrated in accordance with one or more embodiments of the present disclosure. The Scope 3 emission estimation module 160 receives training data 126 corresponding to financial transaction data, enterprise metadata, and spatio-temporal data (e.g. date, time, year, geography, location, origin). The training data 126 can be obtained by a data extraction unit and stored in storage 124.

A tokenization operation is performed on the input training data 126 at training stage 400. The tokenization operation includes applying one or more tokenization techniques to the training data 126. The tokenization techniques can include, but are not limited to, word tokenization, subword tokenization, character tokenization. Accordingly, the tokenization operation divides the converted training data 126 (e.g., financial transaction data, enterprise metadata, and spatio-temporal data) into smaller units called tokens of individual words, subwords, or characters, depending on the tokenization operation performed. In one or more non-limiting embodiments, the tokens can be used to generate corresponding embeddings, e.g., transaction embeddings (et), enterprise embeddings(es) and spatio-temporal embeddings (eg), which are vectors representations of their corresponding tokens and capture the context and meaning of each token.

The embedding are then aggregated or added together along with a cost embedding (ec) at an aggregation training stage 402. A feature representation training stage 404 is then performed to transform the embeddings (e.g., raw data) into a format that can be input to a FM. The feature representation training stage 404 can include, for example, performing data pre-processing (e.g., cleaning, normalization, and handling missing values of the embeddings), feature selection (e.g., choosing a subset of the most relevant features that have the most impact on the model's performance), feature extraction (s transforming raw data into a set of more meaningful and compact representations), feature transformation (e.g., log-transformations, power transformations, and z-score normalization), encoding categorical variables (e.g., encoding variables into a numerical format that can be input to a FM), and feature representation learning (e.g., unsupervised or autoencoder representation learning directly from embeddings).

A domain adaptation training stage 406 utilizes information provided by the source domain to improve the robustness of an FM and make it more capable of generalizing the source domain to a target domain. The domain adaptation training stage 406 may include, but is not limited to, feature-based adaptation, instance-based adaptation, model-based adaptation, self-supervised learning, and unsupervised learning.

A carbon-aware FM fine-tuning operation is performed at training stage 408. The carbon-aware FM fine-tuning operation utilizes feature presentation and a carbon-aware AI loss function ($L_\theta$) (sometimes referred to as a "cost function"). The loss function measures the discrepancy between the predicted output of a carbon-aware FM and the actual target output (e.g., the ground truth) during training. The loss function quantifies how well the model is performing and can be used to guide the training fine tuning process to minimize the error or loss. Various loss functions can be used including, but not limited to, a regression loss function, a classification loss function, a sequence-to-sequence loss function, and a custom loss function.

According to a non-limiting embodiment, the carbon-aware loss function can be defined according to the following equation:

$$\mathcal{L}_\theta(y, y^\wedge, w_{s,g,m}) := -(1/n) * \sum^{n_i=1} y_i^T (w_{s,g,m}^i \circ \log \hat{y}_i), \text{ where} \quad \text{eq. 1}$$

θ defines parameters of the Scope 3 estimation model;
y is the true distribution;
ŷ is the prediction distribution; and
$w^i_{s,g,m}$ is the carbon-aware weights for sector(s), geography (g), and time period (m) of $i^{th}$ transaction data.

Accordingly, the novel carbon-aware loss function can fine-tune the carbon-aware FM with higher penalization on misclassification of sectors with higher carbon footprint.

In at least one non-limiting embodiment, the Scope 3 emission system 150 can iteratively adjust the parameters of a carbon-aware FM to further minimize the value of the loss function. Lower values of the loss function indicate better alignment between the model's predictions and the true targets, which corresponds to an improved performance of the model on a targeted task. According to a non-limiting embodiment, the calculated loss function ($L_\theta$) is compared to a target threshold (Th) at training stage 410. When the loss function ($L_\theta$) is exceeds the threshold (Th), the FM parameters can be adjusted and the carbon-aware FM re-trained via training stages 400 through 408. Once the loss function ($L_\theta$) is below or equal to the threshold (Th), training of the FM can be completed and the trained carbon-aware FM can be utilized by the Scope 3 emission system 150 to estimate the Scope 3 emissions using a domain adapted carbon-aware NLP FM derived from crowd sourced data with reduced the Scope 3 emission uncertainty.

Figure 5:
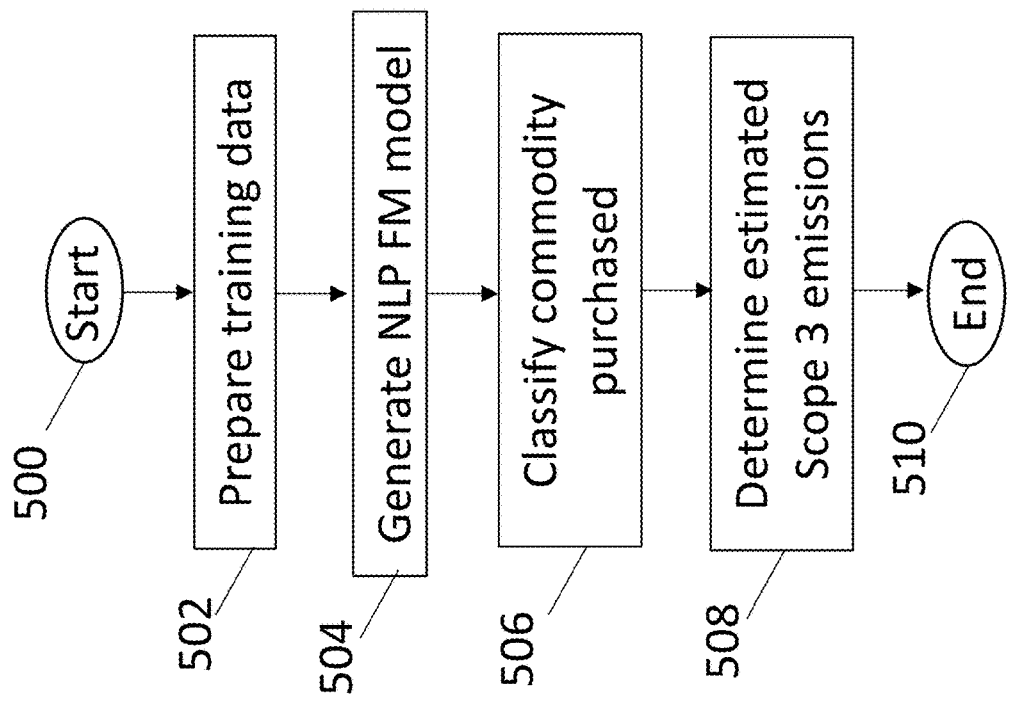
FIG. 5 is a flow diagram illustrating a method for estimating Scope 3 emissions using a domain adapted carbon-aware NLP FM derived from crowd sourced data to reduce the Scope 3 emission uncertainty is illustrated according to a non-limiting embodiment of the present disclosure.

Turning to FIG. 5, a method for estimating Scope 3 emissions using a domain adapted carbon-aware NLP FM derived from crowd sourced data to reduce the Scope 3 emission uncertainty is illustrated according to a non-limiting embodiment. The method begins at operation 500, and prepares training data at operation 502. The preparation of the training data includes receiving financial transactional data, enterprise data and spatio-temporal data (e.g., time of day, day of year, current year, geography, location of enterprise, and origin of commodity), tokenizing the training data, and generating embeddings of the each of the tokens. At operation 504, a carbon-aware NLP FM model is generated. The generation of the carbon-aware NLP FM model includes performing domain adaption on the token embeddings and applying a weight adaptation to the carbon-aware loss function utilized by the NLP FM model. At operation 506, the purchased commodities contributing to Scope 3 emissions are categorized. Categorizing the commodities includes determining categorization errors for given commodities and applying weights to the commodity sectors to reduce the error and increase the categorization identification sensitivity. In one or more non-limiting embodiments, an emission intensity can be determined for different commodity sectors (e.g. agriculture, fishing, mining, textiles, motor vehicles, electricity usage, gas/fuel consumption, air transport, etc.), and a weight for a given commodity or sector can be determined based on the emission intensity. At operation 508, the estimated Scope 3 emissions is determined. According to a non-limiting embodiment, determining the estimated Scope 3 emissions can take into account monetary amount spent on the purchased commodities and other emission factor data (e.g., enterprise transaction data), and the method ends at operation 510.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of estimating Scope 3 emissions, the method comprising:
   generating embeddings based on enterprise financial transaction data, enterprise metadata, and crowd source data, wherein generating the embeddings comprises:
      performing a tokenization operation on training data that has units of a first size and that represent the enterprise financial transaction data, the enterprise metadata, and the crowd source data, the tokenization operation dividing the training data into tokens having a second size that is less than the first size to generate the embeddings;
   generating sector wise carbon-aware spatio-temporal weights indicative of an estimated level of Scope 3 emissions produced by a plurality of corresponding commodity sectors;

passing the embeddings and sector wise carbon-aware spatio-temporal weights through a pre-trained carbon-aware foundation model (FM) to generate predicted emissions data;

inputting the predicted emissions data into a carbon-aware loss function to compute a loss-function value (Le), the carbon-aware loss function defined using the carbon-aware weights for sectors, geography, and time period of transaction data, wherein the transaction data includes the enterprise financial transaction data, the enterprise metadata, and the crowd source data;

repeatedly training the pre-trained carbon-aware FM until the loss-function value ($L_\theta$) is less than or equal to a target threshold (Th);

generating a carbon-aware natural language processing (NLP) foundation model (FM) that is trained according to the embeddings and the sector wise carbon-aware spatio-temporal weights in response to the loss-function value ($L_\theta$) being less than or equal to a target threshold (Th);

inputting into the NLP FM user-generated data indicating at least one target commodity sector and spend data associated with the target commodity sector; and outputting from the NLP FM an estimation of the Scope 3 emissions based on the least one target commodity sector and the spend data.

2. The method of claim 1, wherein the embeddings include enterprise embeddings, cost embeddings, geography embeddings, sector embeddings and spatio-temporal embeddings.

3. The method of claim 2, wherein the crowd source data includes one or a combination of Scope 1 emission data, Scope 2 emission data, enterprise revenue data, enterprise employee data, enterprise electricity consumption data, and enterprise renewable fraction data.

4. The method of claim 3, wherein generating the sector wise carbon-aware spatio-temporal weights comprises:
estimating an emission intensity for a plurality of different commodity sectors; and
determining the spatio-temporal weight for each of the different commodity sectors,
wherein the spatio-temporal weight is determined as a ratio of the emission intensity for a given commodity sector with respect a sum of the emission intensities for the plurality of different commodity sectors.

5. The method of claim 4, wherein the emission intensity is determined as a ratio of estimated emissions produced by a given commodity sector with respect to a monetary amount spent by the given commodity sector.

6. The method of claim 4, wherein generating the carbon-aware NLP FM further comprises fine-tuning the NLP FM using a carbon-aware loss function derived using the sector wise carbon-aware spatio-temporal weights.

7. The method of claim 6, further comprising determining the sector wise carbon-aware spatio-temporal weights based on a plurality of emission intensities, each of the emission intensities corresponding to a respective commodity sector.

8. A Scope 3 emission system comprising:
a controller including a microprocessor and a memory, the memory storing executable instructions that when executed by the microprocessor cause the microprocessor to perform a computer-implemented method comprising:
generating embeddings based on enterprise financial transaction data, enterprise metadata, and crowd source data, wherein generating the embeddings comprises:

performing a tokenization operation on training data that has units of a first size and that represent the enterprise financial transaction data, the enterprise metadata, and the crowd source data, the tokenization operation dividing the training data into tokens having a second size that is less than the first size to generate the embeddings;

generating sector wise carbon-aware spatio-temporal weights indicative of an estimated level of Scope 3 emissions produced by a plurality of corresponding commodity sectors;

passing the embeddings and sector wise carbon-aware spatio-temporal weights through a pre-trained carbon-aware foundation model (FM) to generate predicted emissions data;

inputting the predicted emissions data into a carbon-aware loss function to compute a loss-function value (Le), the carbon-aware loss function defined using the carbon-aware weights for sectors, geography, and time period of transaction data, wherein the transaction data includes the enterprise financial transaction data, the enterprise metadata, and the crowd source data;

repeatedly training the pre-trained carbon-aware FM until the loss-function value ($L_\theta$) is less than or equal to a target threshold (Th);

generating a carbon-aware natural language processing (NLP) foundation model (FM) that is trained according to the embeddings and the sector wise carbon-aware spatio-temporal weights in response to the loss-function value ($L_\theta$) being less than or equal to a target threshold (Th);

inputting into the NLP FM user-generated data indicating at least one target commodity sector and spend data associated with the target commodity sector; and outputting from the NLP FM an estimation of the Scope 3 emissions based on the least one target commodity sector and the spend data.

9. The Scope 3 emission system of claim 8, wherein the embeddings include enterprise embeddings, cost embeddings, geography embeddings, sector embeddings and spatio-temporal embeddings.

10. The Scope 3 emission system of claim 9, wherein the crowd source data includes one or a combination of Scope 1 emission data, Scope 2 emission data, enterprise revenue data, enterprise employee data, enterprise electricity consumption data, and enterprise renewable fraction data.

11. The Scope 3 emission system of claim 10, wherein generating the sector wise carbon-aware spatio-temporal weights comprises:
estimating an emission intensity for a plurality of different commodity sectors; and
determining the spatio-temporal weight for each of the different commodity sectors,
wherein the spatio-temporal weight is determined as a ratio of the emission intensity for a given commodity sector with respect a sum of the emission intensities for the plurality of different commodity sectors.

12. The Scope 3 emission system of claim 11, wherein the emission intensity is determined as a ratio of estimated emissions produced by a given commodity sector with respect to a monetary amount spent by the given commodity sector.

13. The Scope 3 emission system of claim 11, wherein generating the carbon-aware NLP FM further comprises fine-tuning the NLP FM using a carbon-aware loss function derived using the sector wise carbon-aware spatio-temporal weights.

14. The Scope 3 emission system of claim 13, further comprising determining the sector wise carbon-aware spatio-temporal weights based on a plurality of emission intensities, each of the emission intensities corresponding to a respective commodity sector.

15. A computer program product comprising a computer readable storage medium having program instructions embodied therewith to estimate Scope 3 emissions, the program instructions executable by a processor to cause the processor to perform operations comprising:
- generating embeddings based on enterprise financial transaction data, enterprise metadata, and crowd source data, wherein generating the embeddings comprises:
  - performing a tokenization operation on training data that has units of a first size and that represent the enterprise financial transaction data, the enterprise metadata, and the crowd source data, the tokenization operation dividing the training data into tokens having a second size that is less than the first size to generate the embeddings;
- generating sector wise carbon-aware spatio-temporal weights indicative of an estimated level of Scope 3 emissions produced by a plurality of corresponding commodity sectors;
- passing the embeddings and sector wise carbon-aware spatio-temporal weights through a pre-trained carbon-aware foundation model (FM) to generate predicted emissions data;
- inputting the predicted emissions data into a carbon-aware loss function to compute a loss-function value (Le), the carbon-aware loss function defined using the carbon-aware weights for sectors, geography, and time period of transaction data, wherein the transaction data includes the enterprise financial transaction data, the enterprise metadata, and the crowd source data;
- repeatedly training the pre-trained carbon-aware FM until the loss-function value ($L_\theta$) is less than or equal to a target threshold (Th);
- generating a carbon-aware natural language processing (NLP) foundation model (FM) that is trained according to the embeddings and the sector wise carbon-aware spatio-temporal weights in response to the loss-function value ($L_\theta$) being less than or equal to a target threshold (Th);
- inputting into the NLP FM user-generated data indicating at least one target commodity sector and spend data associated with the at least one target commodity sector; and
- outputting from the NLP FM an estimation of the Scope 3 emissions based on the least one target commodity sector and the spend data.

16. The computer program product of claim 15, wherein the embeddings include enterprise embeddings, cost embeddings, geography embeddings, sector embeddings and spatio-temporal embeddings.

17. The computer program product of claim 16, wherein the crowd source data includes one or a combination of Scope 1 emission data, Scope 2 emission data, enterprise revenue data, enterprise employee data, enterprise electricity consumption data, and enterprise renewable fraction data.

18. The computer program product of claim 17, wherein generating the sector wise carbon-aware spatio-temporal weights comprises:
- estimating an emission intensity for a plurality of different commodity sectors; and
- determining the spatio-temporal weight for each of the different commodity sectors,
- wherein the spatio-temporal weight is determined as a ratio of the emission intensity for a given commodity sector with respect a sum of the emission intensities for the plurality of different commodity sectors.

19. The computer program product of claim 18, wherein the emission intensity is determined as a ratio of estimated emissions produced by a given commodity sector with respect to a monetary amount spent by the given commodity sector.

20. The computer program product of claim 18, wherein the operations further comprise:
- determining a plurality of emission intensities, each of the emission intensities corresponding to a respective commodity sector;
- determining the sector wise carbon-aware spatio-temporal weights based on the plurality of emission intensities;
- deriving a carbon-aware loss function using the sector wise carbon-aware spatio-temporal weights; and
- fine-tuning the NLP FM using the carbon-aware loss function.

* * * * *